US008098735B2

(12) United States Patent
Benzreba et al.

(10) Patent No.: US 8,098,735 B2
(45) Date of Patent: Jan. 17, 2012

(54) EFFICIENT 8×8 CABAC RESIDUAL BLOCK DECODE

(75) Inventors: Jamal Benzreba, Kitchener (CA); Harminder Banwait, Waterloo (CA); Eric Pearson, Conestogo (CA)

(73) Assignee: LSI Corporation, Milpitas, CA (US)

( * ) Notice: Subject to any disclaimer, the term of this patent is extended or adjusted under 35 U.S.C. 154(b) by 1426 days.

(21) Appl. No.: 11/643,643

(22) Filed: Dec. 21, 2006

(65) Prior Publication Data
US 2008/0152015 A1 Jun. 26, 2008

(51) Int. Cl.
*H04N 7/12* (2006.01)
*H04N 11/02* (2006.01)
*H04N 11/04* (2006.01)

(52) U.S. Cl. ............... 375/240.23; 375/240.02; 375/253; 341/51; 341/107

(58) Field of Classification Search ............ 341/51; 375/240.02, 240.23, 253
See application file for complete search history.

(56) References Cited

U.S. PATENT DOCUMENTS

| 7,245,242 | B2 * | 7/2007 | Hu et al. ............... 341/107 |
| 7,463,781 | B2 * | 12/2008 | Pearson et al. ............ 382/247 |
| 7,525,456 | B2 * | 4/2009 | Watanabe ............... 341/51 |
| 2005/0147172 | A1 * | 7/2005 | Winger et al. ........... 375/240.23 |
| 2005/0258982 | A1 * | 11/2005 | Pearson et al. ............ 341/50 |
| 2006/0017592 | A1 * | 1/2006 | Shim et al. ............... 341/50 |
| 2007/0092150 | A1 * | 4/2007 | Chiba et al. ............. 382/247 |
| 2007/0098070 | A1 * | 5/2007 | Saigo et al. ............. 375/240.12 |
| 2007/0262886 | A1 * | 11/2007 | Kim et al. ............... 341/50 |
| 2008/0013633 | A1 * | 1/2008 | Ye et al. ............... 375/240.24 |
| 2008/0075173 | A1 * | 3/2008 | Jain et al. ............. 375/240.25 |
| 2008/0260028 | A1 * | 10/2008 | Lamy-Bergot et al. .. 375/240.13 |

OTHER PUBLICATIONS

Ihab Amer, Wael Badawy, Graham Jullien, Towards MPEG-4 Part 10 System on Chip: A VLSI Prototype for Context Based Adaptive Variale Length Coding(CAVLC), Oct. 13-15, 2004, Signal Processing Systems, 2004. SIPS 2004. IEEE Workshop on, p. 275.*

Thomas Wiegand, Gary J. Sullivan, Bjontegaard, Ajay Luthra, Overview of the H.264/AVC Video Coding Standard, Jul. 2003, vol. 13 Issue 7, pp. 560.*

* cited by examiner

*Primary Examiner* — Thai Tran
*Assistant Examiner* — Sunghyoun Park
(74) *Attorney, Agent, or Firm* — Christopher P. Maiorana, PC (57) ABSTRACT

A circuit generally having a first module, a second module and a third module is disclosed. The first module may be configured to (i) generate a plurality of parsed residual blocks by parsing an 8×8 CABAC (context-based adaptive binary arithmetic coding) residual block received in an input signal and (ii) generate a plurality of metric signals resulting from the parsing of the 8×8 CABAC residual block. The second module may be configured to generate a scanning position signal based on the metric signals. The third module may be configured to generating a plurality of 4×4 CAVLC (context-based adaptive variable length coding) residual blocks in an output signal by sub-sampling the parsed residual blocks based on the scanning position signal.

21 Claims, 9 Drawing Sheets

EFFICIENT 8×8 CABAC RESIDUAL BLOCK DECODE

CROSS REFERENCE TO RELATED APPLICATIONS

The present application is related to co-pending U.S. application Ser. No. 11/643,642 filed Dec. 21, 2006, which is hereby incorporated by reference in its entirety.

FIELD OF THE INVENTION

The present invention relates to video processing generally and, more particularly, to a system for implementing an efficient 8×8 CABAC residual block decode.

BACKGROUND OF THE INVENTION

A device compatible with the High 10 profile of the H.264 video specification must be capable of decoding an 8×8 CABAC residual block of transform coefficient levels. In order to decode an H.264 High 10 profile bitstream, the 8×8 Context-based Adaptive Binary Arithmetic Coding (CABAC) residual block can be transcoded into four 4×4 Context-based Adaptive Variable Length Coding (CAVLC) residual blocks of transform coefficient levels.

Conventional approaches perform the 8×8 CABAC residual block trans-coding using software. However, a software solution incurs latency and inertly experiences a loss of performance.

It would be desirable to implement a system for an efficient 8×8 CABAC residual block decode that does not suffer such loss of performance typically associated with software implementations.

SUMMARY OF THE INVENTION

The present invention concerns a circuit generally comprising a first module, a second module and a third module. The first module may be configured to (i) generate a plurality of parsed residual blocks by parsing an 8×8 CABAC (context-based adaptive binary arithmetic coding) residual block received in an input signal and (ii) generate a plurality of metric signals resulting from the parsing of the 8×8 CABAC residual block. The second module may be configured to generate a scanning position signal based on the metric signals. The third module may be configured to generating a plurality of 4×4 CAVLC (context-based adaptive variable length coding) residual blocks in an output signal by sub-sampling the parsed residual blocks based on the scanning position signal.

The objects, features and advantages of the present invention include providing efficient residual block decode system that may (i) be implemented with 8×8 CABAC blocks, (ii) be implemented without the loss of performance typically associated with software and/or (iii) reorder various values in parallel with parsing of syntax elements, (iv) reduce a transcoding latency and/or (v) be implemented with minimal hardware.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
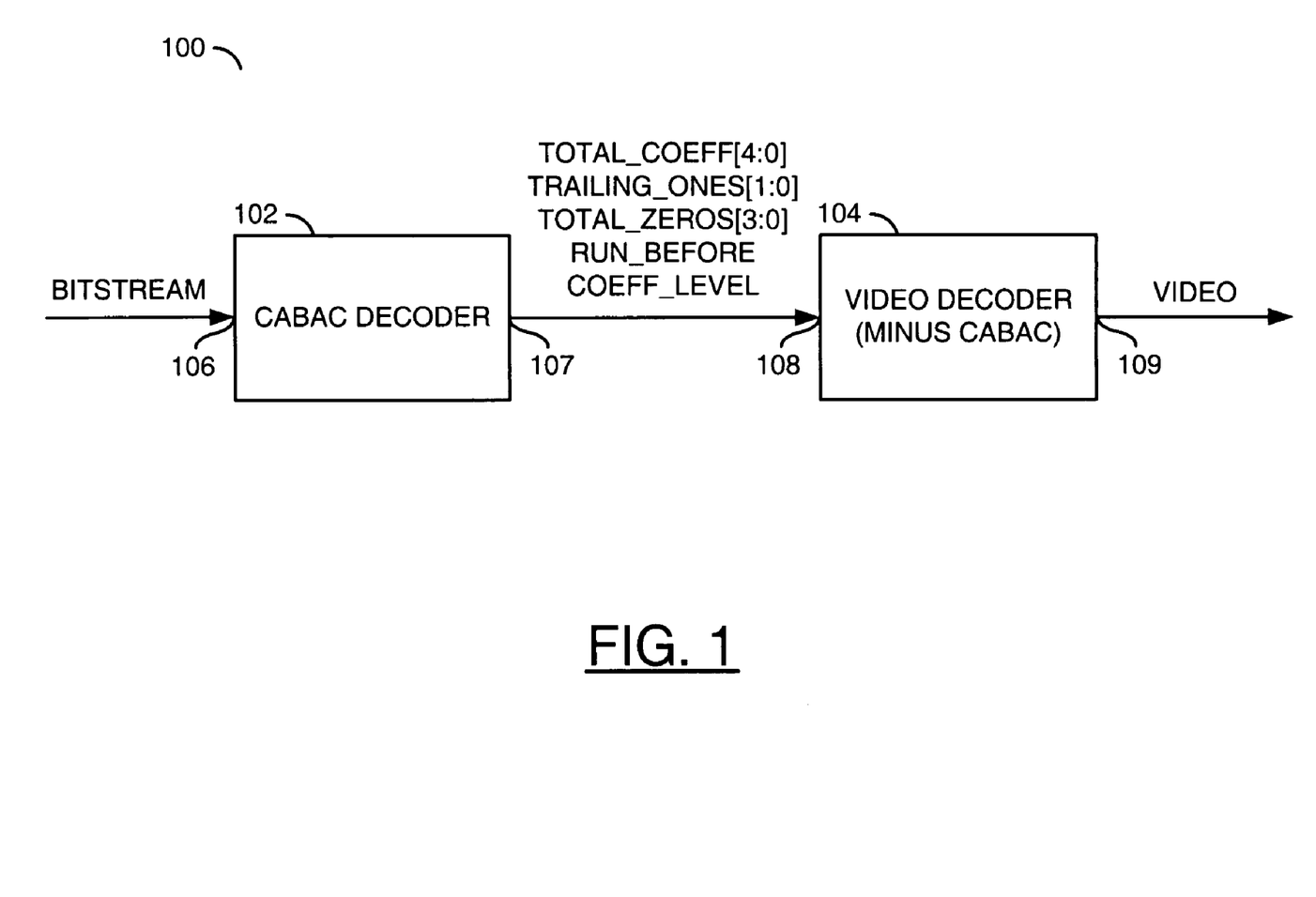
FIG. 1 is a block diagram illustrating a system in accordance with the present invention.

Referring to FIG. 1, a block diagram of a system 100 is shown in accordance with a preferred embodiment of the present invention. The system 100 generally comprises a block (or circuit) 102 and a block (or circuit) 104. In one example, the circuit 102 may be implemented as a CABAC decoder. In one example, the circuit 104 may be implemented as a video decoder without the CABAC circuitry. The circuit 102 may have an input 106 that may receive an input signal (e.g., BITSTREAM). The signal BITSTREAM may be a compressed video signal. The circuit 102 may have an output 107 that may present a number of processed signals (e.g., TOTAL_COEFF[4:0], TRAILING ONES[1:0]; TOTAL ZEROS[3:0], RUN_BEFORE, and/or COEFF_LEVEL). The circuit 104 may have an input 108 that may receive the processed signals. The circuit 104 may have an output 109 that may present a signal (e.g., VIDEO). The circuit 104 may generate the signal VIDEO in response to the processed signals generated by the circuit 102. The signal VIDEO may be an uncompressed video signal.

The signal BITSTREAM may be compliant with the H.264 Recommendation, High 10 profile. Other residual block CALVC semantics may be as follows. The signals TOTAL_COEFF and TRAILING_ONES generally specify, respectively, the total number of non-zero transform coefficient levels and the number of trailing one transform coefficient levels in a transform coefficient level scan. A TRAILING_ONE transform coefficient level may be one of up to three consecutive non-zero transform coefficient levels having an absolute value equal to 1 at the end of a scan of non-zero transform coefficient levels. The signal TOTAL_ZERO generally specifies the total number of zero-valued transform coefficient levels that are located before the position of the last non-zero transform coefficient level in a scan of transform coefficient levels. The signal RUN_BEFORE may specify the number of consecutive transform coefficient levels in the scan with zero value before a non-zero valued transform coefficient level. The signal COEFF_LEVEL generally contains a maximum number of transform coefficient levels for the current list of transform coefficient levels.

The signal TOTAL_COEFF[4:0], the signal TRAILING_ONES[1:0], and the signal TOTAL_ZEROS[3:0] may be control signals. The signal RUN_BEFORE and the signal COEFF_LEVEL may be data signals (e.g., transform coefficients). Each of the control and data signals may represent a number of intermediate signals relating to each CAVLC block. For example, a first CAVLC block may contain a signal TOTAL_COEFF0, a signal TRAILING_ONES0, a signal TOTAL_ZEROS0, a number of signals RUN_BEFORE00 to RUN_BEFORE 14, and a number of signals COEFF00 to COEFF15. A second CAVLC block may contain a signal TOTAL_COEFF1, a signal TRAILING_ONES1, a signal TOTAL_ZEROS1, a number of signals RUN_BEFORE16 to RUN_BEFORE30, a number of signals COEFF16 to COEFF31. Similarly, a third CAVLC block may contain a signal TOTAL_COEFF2, a signal TRAILING_ONES2, a signal TOTAL_ZEROS2, a number of signals RUN_BEFORE32 to RUN_BEFORE46, a number of signals COEFF32 to COEFF47. Similarly, a fourth CAVLC block may contain a signal TOTAL_COEFF3, a signal TRAILING_ONES3, a signal TOTAL_ZEROS3, a signal RUN_BEFORE48 to RUN_BEFORE62, a number of signals COEFF48 to COEFF63. In the general diagram of the circuit 100, these individual signals are within the general signals presented at the output 107. In general, each of the signals COEFF_LEVEL is implemented as an 18-bit signal to implement a total of 16 signals COEFF_LEVEL for each CAVLC block. For example, in block 1 the signals RUN_BEFORE00 to RUN_BEFORE07 may be 4-bits each. The signals RUN_BEFORE08 to RUN_BEFORE11 may each be 3-bits. The signals RUN_BEFORE12 and the signal RUN_BEFORE13 may each be 2-bits. The signal RUN_BEFORE14 may be a 1-bit signal. Similar assignments may be made for the CAVLC block 2, block 3, and block 4.

Figure 2:
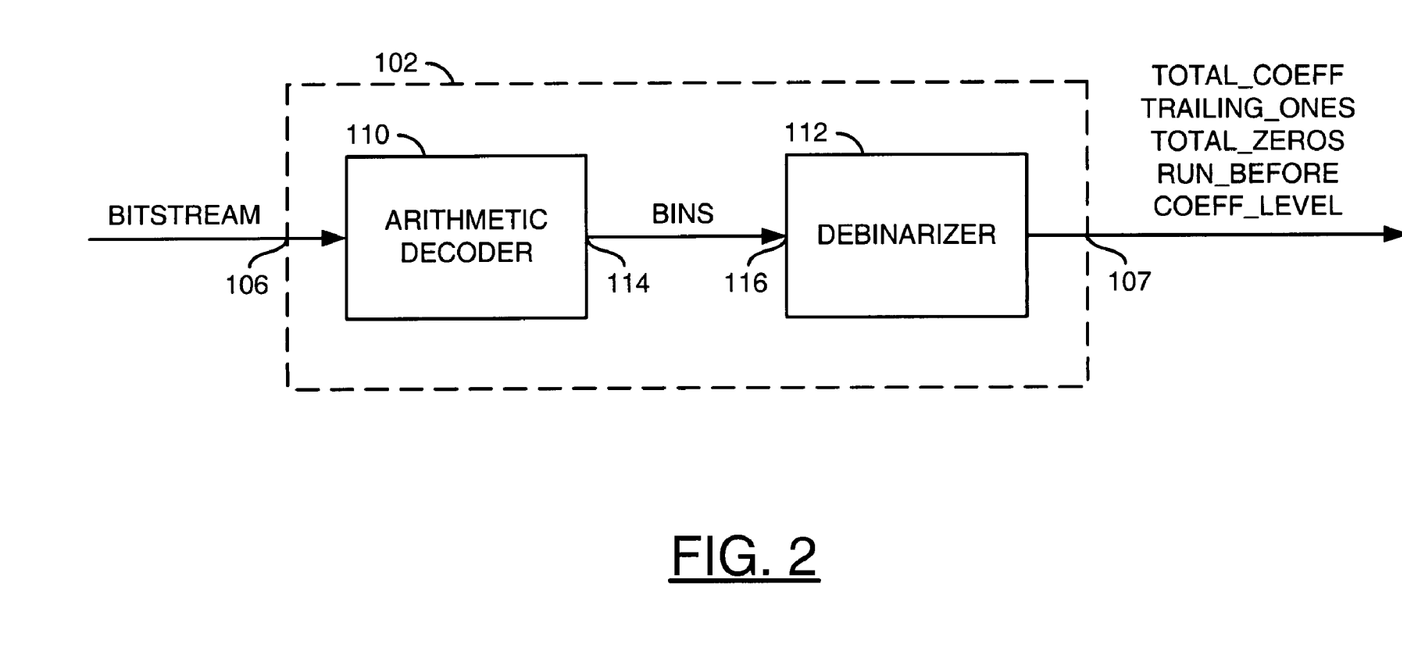
FIG. 2 is a more detailed diagram of the CABAC decoder of FIG. 1.

Referring to FIG. 2, a more detailed diagram of the CABAC decoder circuit 102 is shown. The circuit 102 generally comprises a block (or circuit) 110 and a block (or circuit) 112. In one example, the circuit 110 may be implemented as an arithmetic decoder. In one example, the circuit 112 may be implemented as a debinarizar circuit. The circuit 110 may generate a signal (e.g., BINS) in response to the signal BITSTREAM. The signal BINS may be presented to an output 114. The circuit 112 may generate the processed signals in response to the signal BINS. The circuit 112 may have an input 116 that may receive the signal BINS.

Figure 3:
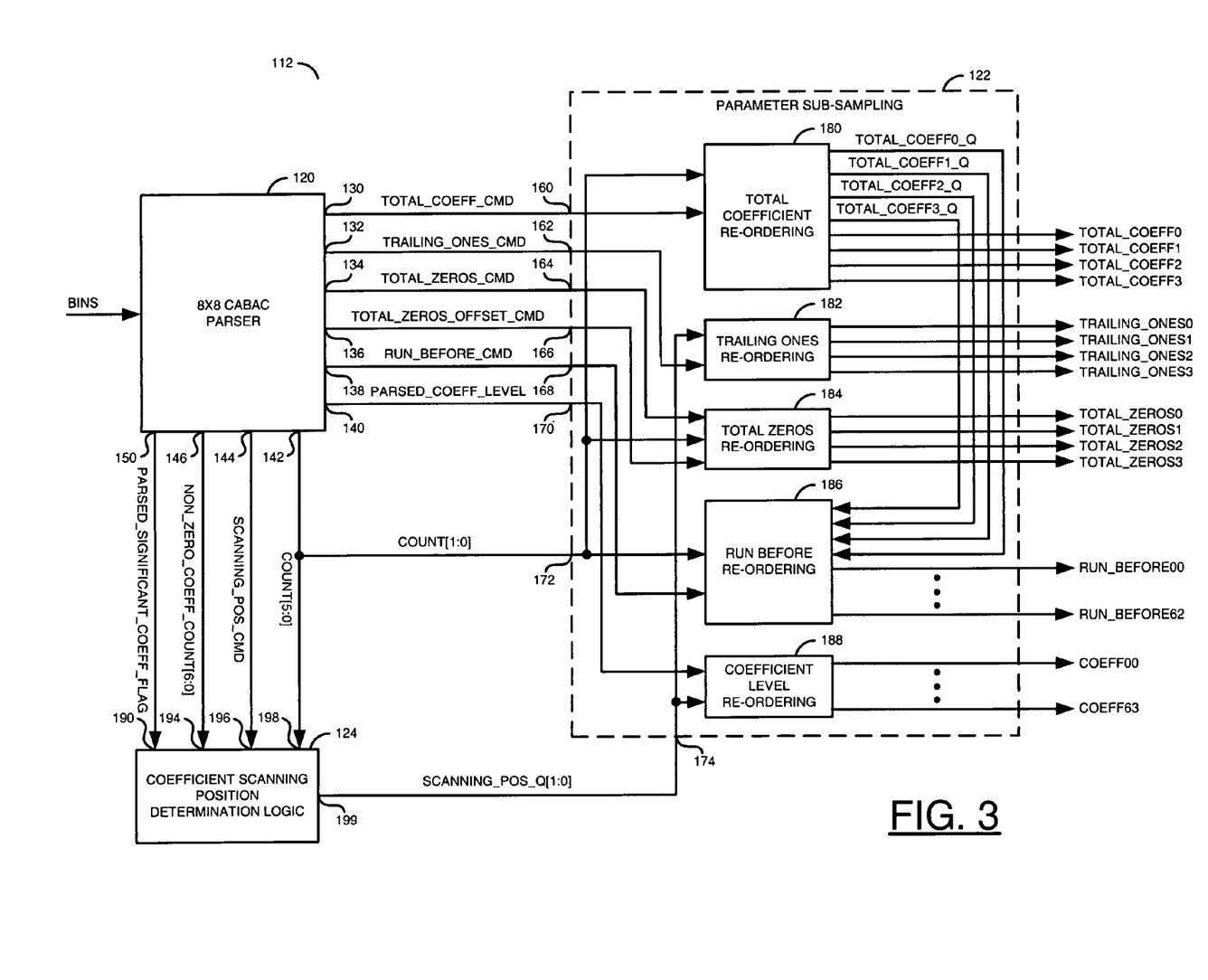
FIG. 3 is a more detailed diagram of the debinarization circuit of FIG. 2.

Referring to FIG. 3, a more detailed diagram of the debinarization circuit 112 is shown. The circuit 112 generally comprises a block (or circuit) 120, a block (or circuit) 122 and a block (or circuit) 124. In one example, the circuit 120 may be implemented as a CABAC Parser. For example, the circuit 120 may be implemented as an 8×8 CABAC Parser circuit. In one example, the circuit 122 may be a sampling circuit. In one implementation, the circuit 122 may be implemented as a parameter sub-sampling circuit. In one example, the circuit 124 may be implemented as a logic circuit. In one implementation, the logic circuit 124 may be implemented as a coefficient scanning position determination logic circuit.

The circuit 120 may have an output 130 may present a signal (e.g., TOTAL_COEFF_CMD), an output 132 that may present a signal (e.g., TRAILING_ONES_CMD), an output 134 may present a signal (e.g., TOTAL_ZEROS_CMD), an output 136 that may present a signal (e.g., TOTAL_ZEROS_OFFSET_CMD), an output 138 that may present a signal (e.g., RUN_BEFORE_CMD), and an output 140 that may present a signal (e.g., PARSED_COEFF_LEVEL). The circuit 120 may also have an output 142 that may present a signal (e.g., COUNT[5:0]), an output 144 that may present a signal (e.g., SCANNING_POS_CMD), an output 146 that may present a signal (e.g., NON_ZERO_COEFF_COUNT [6:0]) and an output 150 that may present a signal (e.g., PARSED_SIGNIFICANT_COEFF_FLAG).

The circuit 122 may have an input 160 that may receive the signal TOTAL_COEFF CMD, an input 162 that may receive the signal TRAILING_ONES_CMD, an input 164 that may receive the signal TOTAL_ZEROS_CMD, an input 166 that may receive the signal TOTAL_ZEROS_OFFSET_CMD, an input 168 that may receive the signal RUN_BEFORE_CMD, an input 170 that may receive the signal PARSED_COEFF_LEVEL, an input 172 that may receive a first and second bit of the signal COUNT (e.g., [1:0]), and an input 174 that may receive a signal (e.g., SCANNING_POS_Q[1:0]). The circuit 122 generally comprises a block (or circuit) 180, a block (or circuit) 182, a block (or circuit) 184, a block (or circuit) 186, a block (or circuit). 188. In one example, the circuit 180 may be implemented as a total coefficient re-ordering circuit. In one example, the circuit 182 may be implemented as a trailing ones re-ordering circuit. In one example, the circuit 184 may be implemented as a total zeros re-ordering circuit. In one example, the circuit 186 may be implemented as a run before re-ordering circuit. In one example, the circuit 188 may be implemented as a coefficient level re-ordering circuit.

The circuit 124 may have an input 190 that may receive the signal PARSED_SIGNIFICANT_COEFF_FLAG, an input 194 that may receive the signal NON_ZERO_COEFF_COUNT[6:0], an input 196 that may receive the signal SCANNING_POS_CMD, and an input 198 that may receive six bits of the signal COUNT (e.g., [5:0]). The circuit 124 may have an output 199 that may present the signal SCANNING_POS_Q[1:0].

The circuit 180 may generate a signal TOTAL_COEFF0_Q, a signal TOTAL_COEFF1_Q, a signal TOTAL_COEFF2_Q, and a signal TOTAL_COEFF3_Q that may be presented to the circuit 186. The circuit 180 may also present a signal TOTAL_COEFF0, a signal TOTAL_COEFF1, a signal TOTAL_COEFF2, and a signal TOTAL_COEFF3. The circuit 180 generates the signals TOTAL_COEFF[0-3]_Q and TOTAL_COEFF0-3 in response to the signal COUNT[1:0] and the signal TOTAL_COEFF_CMD. The circuit 182 may generate a number of signals TRAILING_ONES0-3 in response to the signal SCANNING_POS_Q[1:0] and the signal TRAILING_ONES_CMD. The circuit 184 may generate a number of signals TOTAL_ZEROS0-3 in response to the signal COUNT[1:0], the signal TOTAL_ZEROS_CMD and the signal TOTAL_ZEROS_OFFSET_CMD. The circuit 186 may generate a number of signals RUN_BEFORE00-62 in response to the signals received from the circuit 180, the signal COUNT[1:0] and the signal RUN_BEFORE_CMD. The circuit 188 may generate a number of signals COEFF00-63 in response to the signal PARSED_COEFF_LEVEL and the signal SCANNING_POS_Q[1:0]. The operation of the circuit 180, the circuit 182, the circuit 184, the circuit 186 and the circuit 188 will be described in more detail in connection with FIGS. 5-9.

Figure 4:
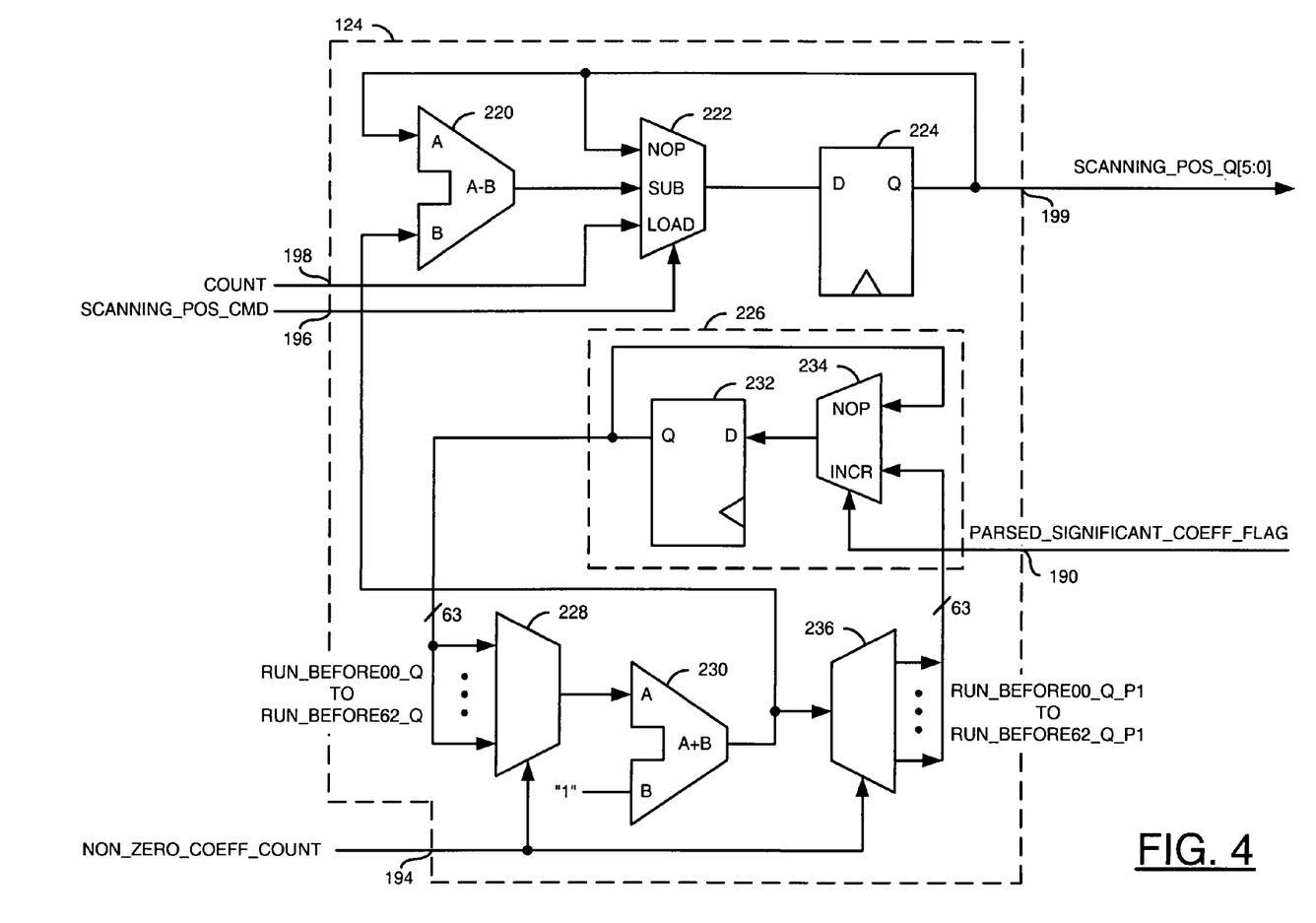
FIG. 4 is a diagram of the coefficient scanning position determination logic.

Referring to FIG. 4, a more detailed diagram of the circuit 124 shown. The circuit 124 generally comprises a block (or circuit) 220, a block (or circuit) 222, a block (or circuit) 224, a block (or circuit) 226, a block (or circuit) 228, a block (or circuit) 230, a block (or circuit) 232, a block (or circuit) 234, and a block (or circuit) 236. The block 226 may be implemented as a block (or circuit) 232 and a block (or circuit) 234. The circuit 226 may be implemented as a number of instances (e.g., 63) of the circuit 232 and the circuit 234. In one example, the circuit 220 may be a subtractor circuit. The circuit 220 may subtract a second input (e.g., B) from a first input (e.g., A) to present an output signal (e.g., A−B). In one example, the circuit 222 may be implemented as a multiplexer. In the example shown, the circuit 222 maybe implemented as a 3:1 multiplexer. A first input (e.g., NOP) may receive the Q output from the circuit 224, a second input (e.g., SUB) may receive the signal A−B and a third input (e.g., LOAD) may receive a signal COUNT. A select input may receive the signal SCANNING_POS_CMD.

The circuit 224 may be implemented as a register. In one example, the circuit 224 may be implemented as a number of D type flip-flops. However, other flip-flop types may be implemented to make a design criteria of a particular implementation. An input (e.g., D) of the circuit 224 may receive an output from the multiplexer 222. An output (e.g., Q) of the circuit 224 may present the signal SCANNING_POS_Q[5:0].

The circuit 232 may be implemented as a register. An input (e.g., D) of the circuit 232 may receive a signal from circuit 234 and may present a signal to an output (e.g., Q). The circuit 234 may have an input (e.g., NOP) that receive a signal from the Q output from the circuit 232 as well as an input (e.g., INCR) that may receive a signal from the circuit 236. The signal PARSED_SIGNIFICANT_COEFF_FLAG may be used as a control input to select either the input NOP or the input INCR. Each instance of the output Q of the circuit 232 may be presented to one of the inputs of the circuit 228. While 63 inputs are shown presented to the circuit 228, the particular number of inputs presented to the circuit 228 may be varied to meet the design criteria of a particular implementation.

The circuit 228 normally presents a signal to an input (e.g., A) of the circuit 230. An input (e.g., B) to the circuit 230 generally receives a digital "1". The circuit 230 presents a summation signal (e.g., A+B) to the circuit 236 as well as to the input B of the circuit 220. The circuit 228 has a select input controlled by the signal NON_ZERO_COEFF_COUNT. The circuit 236 may be implemented as a demultiplexer circuit. The demultiplexer circuit 236 may present a number of output signals (e.g., RUN_BEFORE00_Q_P1 to RUN_BEFORE62_Q_P1), one to each of the instances of the circuit 226. The demultiplexer circuit 236 may also be controlled by the signal NON_ZERO_COEFF_COUNT.

Figure 5:
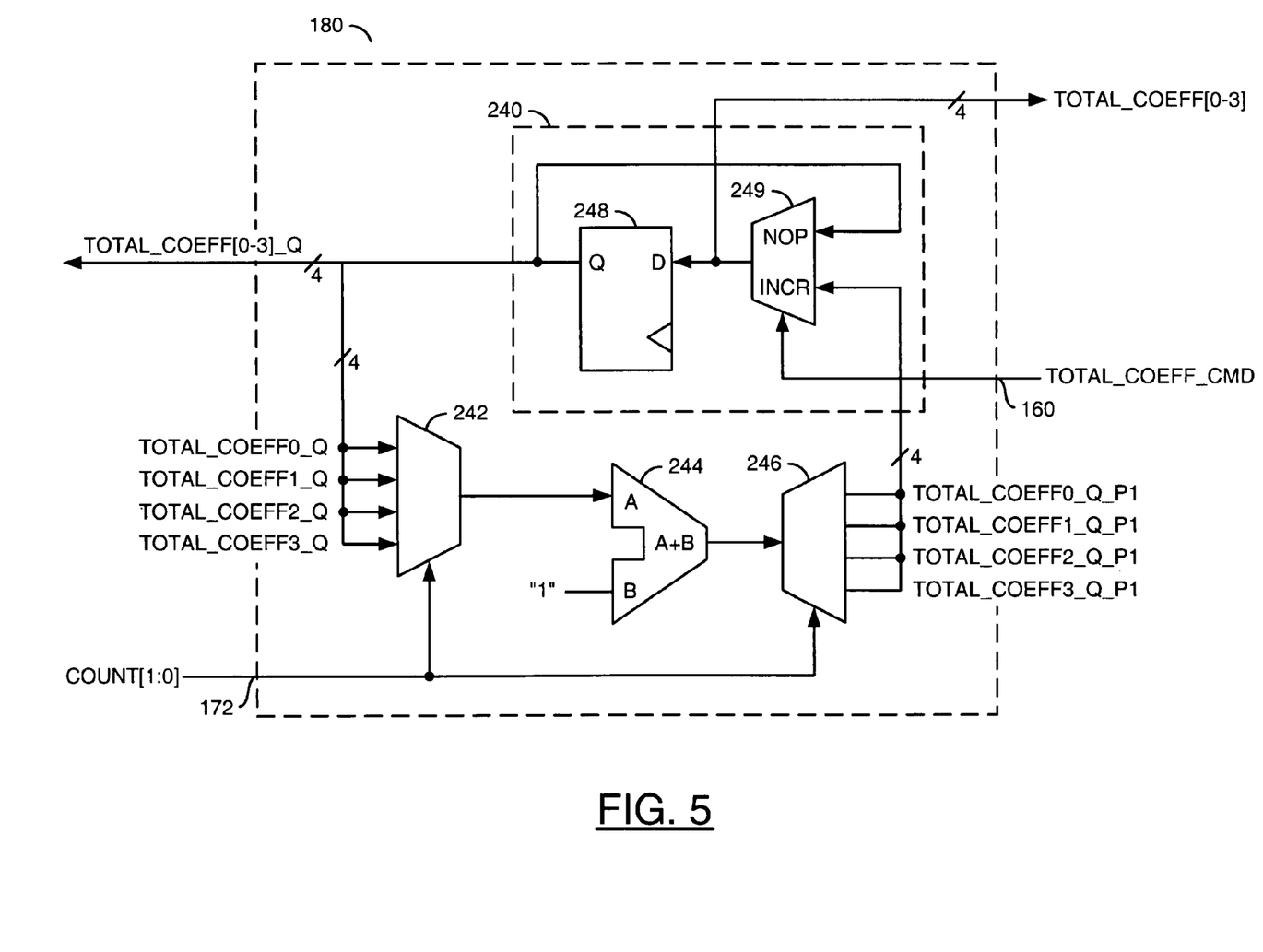
FIG. 5 is a diagram illustrating the reordering of the total coefficients.

Referring to FIG. 5, a more detailed diagram of the circuit 180 is shown. The circuit 180 generally comprises a block (or circuit) 240, a block (or circuit) 242, a block (or circuit) 244, a block (or circuit) 246. The circuit 240 generally comprises a block (or circuit) 248 and a block (or circuit) 249. The circuit 240 represents a number of instances (e.g., 4) of the circuit 248 and the circuit 249. The circuit 242 may be implemented as a multiplexer circuit. In the example shown, the circuit 242 is implemented as a 4:1 multiplexer. However, the particular number of inputs to the multiplexer 242 may be varied to make the design criteria of a particular implementation. In general, the multiplexer 242 receives a number of signals TOTAL_COEFF0_Q, TOTAL_COEFF1_Q, TOTAL_COEFF2_Q, and TOTAL_COEFF3_Q from each of the instances of the circuit 240. The multiplexer 242 has a control input that receive the signal COUNT[1:0].

An output of the multiplexer 242 may be presented to an input (e.g., A) of the circuit 244. An input (e.g., B) of the circuit 244 may receive a digital "1". The circuit 244 generally, presents an output as a sum of the input A and the input B (e.g., A+B). The output of the circuit 244 is normally presented to an input of the circuit 246. The circuit 246 may be implemented as a demultiplexer circuit. A control input for the circuit 246 generally receives the signal COUNT[1:0]. The circuit 246 may present a number of signals TOTAL_COEFF0_Q_P1, TOTAL_COEFF1_Q_P1, TOTAL_COEFF2_Q_P1, and TOTAL_COEFF3_Q_P1, one to each instance of the circuit 249. A first signal of the circuit 246 may be presented to an input (e.g., INCR) of one of the instances of the circuit 249. The other signals from the circuit 246 may be presented to the inputs INCR of the other instances of the circuit 249. An input (e.g., NOP) of the circuit 249 normally receives an output (e.g., Q) of the circuit 248.

An output of the circuit 249 is presented to the D input of the circuit 248. The output of the instances of the circuit 249 may be used to present the signals TOTAL_COEFF0, TOTAL_COEFF1, TOTAL_COEFF2, and TOTAL_COEFF3.

Figure 6:
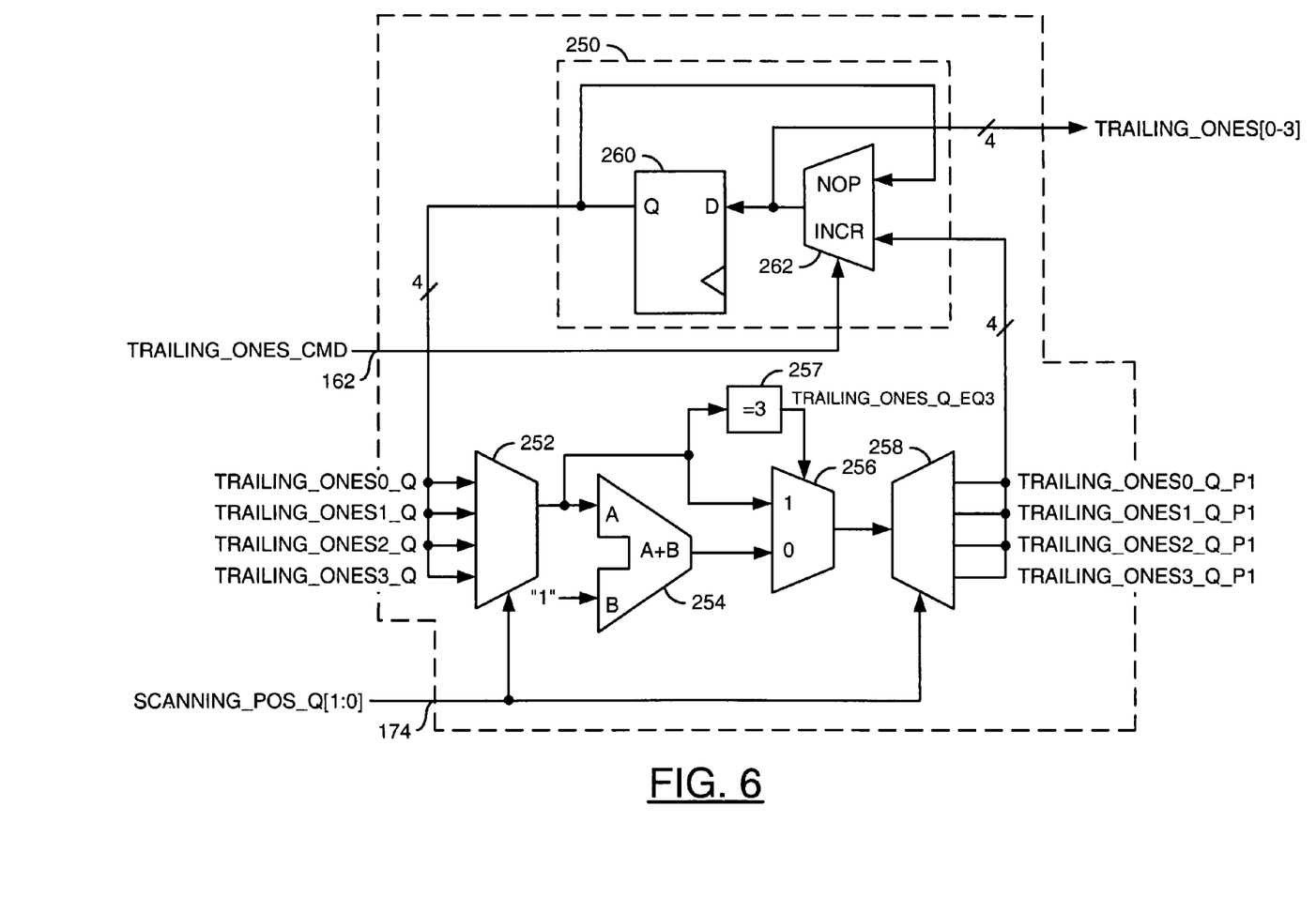
FIG. 6 is a diagram illustrating the reordering of the trailing ones semantics.

Referring to FIG. 6, a more detailed diagram of the circuit 182 is shown. The circuit 182 generally comprises a block (or circuit) 250, a block (or circuit) 252, a block (or circuit) 254, a block (or circuit) 256, a block (or circuit) 257, and a block (or circuit) 258. The circuit 250 generally comprises a block (or circuit) 260 and a block (or circuit) 262. The circuit 250 represents a number of instances (e.g., 4) of the circuit 260 and the circuit 262. The circuit 252 may be implemented as a multiplexer circuit. In the example shown, the circuit 252 is implemented as a 4:1 multiplexer. However, the particular number of inputs to the multiplexer 252 may be varied to make the design criteria of a particular implementation. The multiplexer 252 has a control input that receive the signal SCANNING_POS_Q[1:0]. The multiplexer 252 also receives a number of TRAILING_ONES0_Q, TRAILING_ONES1_Q, TRAILING_ONES2_Q, and TRAILING_ONES3_Q, one from each instance of the circuit 250. An output of the multiplexer 252 may be presented to an input (e.g., A) of the circuit 254, an input of circuit 256 and to the circuit 257. An input (e.g., B) of the circuit 254 may receive a digital "1". The circuit 254 generally presents an output as a sum of the input A and the input B (e.g., A+B). The output of the circuit 254 is normally presented to an input of the circuit 256.

The circuit 256 may be implemented as a multiplexer circuit. A control input for the circuit 256 generally receives the signal TRAILING_ONES_Q_EQ3, through the circuit 257. The circuit 256 generally presents an output to circuit 258. The circuit 258 may be implemented as a demultiplexer circuit. A control input for the circuit 258 generally receives the signal SCANNING_POS_Q[1:0]. The output of the circuit 258 may be used to present the signals TRAILING_ONES0_Q_P1, TRAILING_ONES1_Q_P1, TRAILING_ONES2_Q_P1, and TRAILING_ONES3_Q_P1, one to each of the instances of the circuit 262. A first signal of the circuit 258 may be presented to an input (e.g., INCR) of one of the instances of the circuit 262. The other signals may be presented to the INCR inputs of the other instances of the circuit 262. An input (e.g., NOP) of the circuit 262 normally receives an output (e.g., Q) of the circuit 260. An output of the circuit 262 is presented to the D input of the circuit 260. The output of the circuit 262 may be used to present the signals TRAILING_ONES0, TRAILING_ONES1, TRAILING_ONES2 and TRAILING_ONES3.

Figure 7:
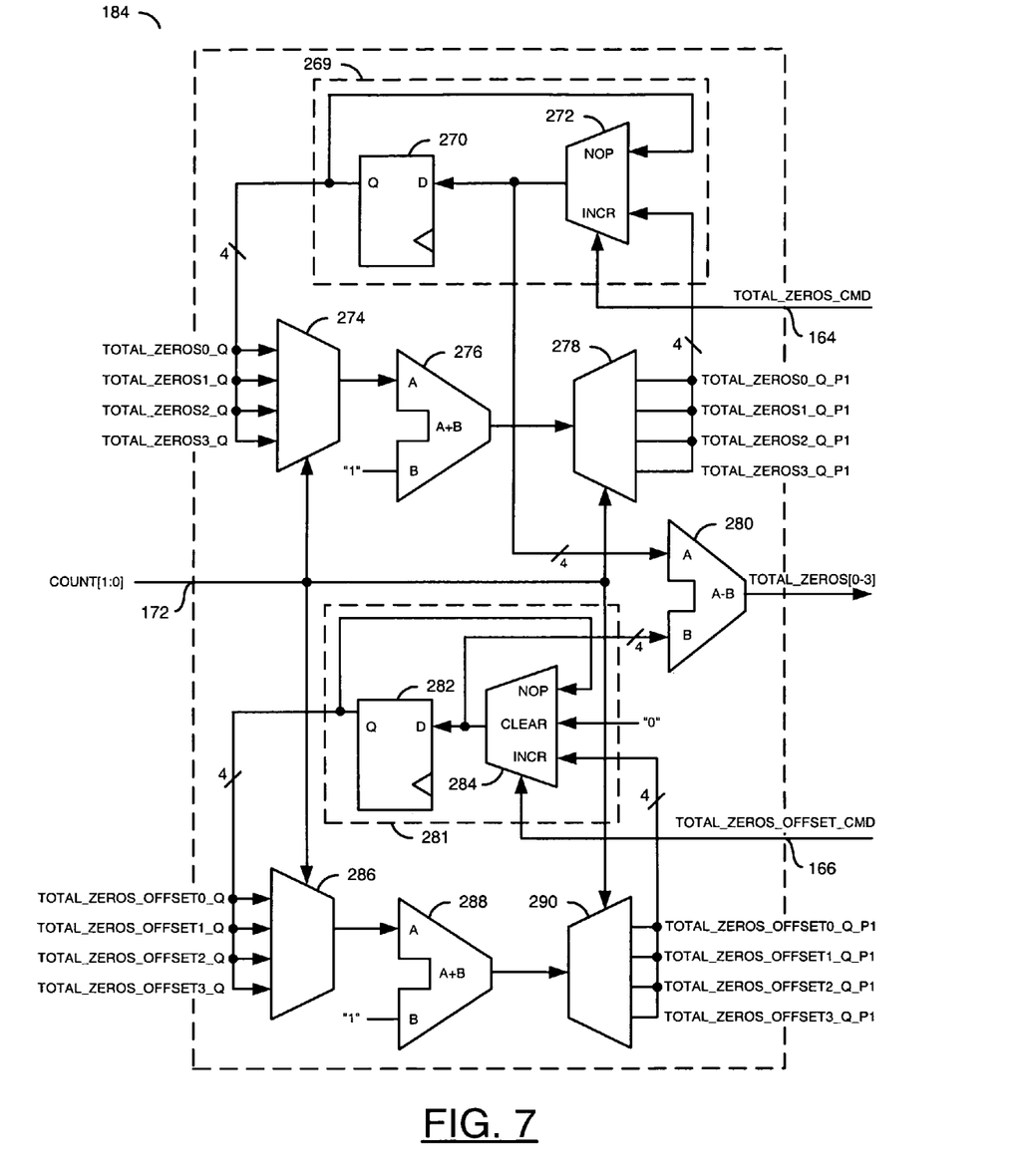
FIG. 7 is a diagram illustrating the reordering of the total zeros semantics.

Referring to FIG. 7, a more detailed diagram of the circuit 184 is shown. The circuit 184 generally comprises a block (or circuit) 269 (that generally comprises a block (or circuit) 270, a block (or circuit) 272), a block (or circuit) 274, a block (or circuit) 276, a block (or circuit) 278, a block (or circuit) 280, a block (or circuit) 281 (that generally comprises a block (or circuit) 282, and a block (or circuit) 284), a block (or circuit) 286, a block (or circuit) 288, and a block (or circuit) 290. The block 269 generally represents a number of instances (e.g., 4) of the circuit 270 and the circuit 272. The block 281 generally represents a number of instances (e.g., 4) of the circuit 282 and the circuit 284. A number of instances (e.g., 4) of the circuit 280 may be implemented, each configured to receive signals from the instances of the circuit 269 and the circuit 281.

The circuit 274 may be implemented as a multiplexer circuit. In the example shown, the circuit 274 is implemented as a 4:1 multiplexer. However, the particular number of inputs to the multiplexer 274 may be varied to meet the design criteria of a particular implementation. The multiplexer 274 may have a control input that may receive the signal COUNT[1:0]. The circuit 274 normally receives an input from each of the instances of the circuit 269. An output of the multiplexer 274 may be presented to an input (e.g., A) of the circuit 276. Another input (e.g., B) of the circuit 276 may receive a digital "1". The circuit 276 may present an output as a sum of the input A and the input B (e.g., A+B). The output of the circuit 276 is normally presented to an input of the circuit 278.

The circuit 278 may be implemented as a demultiplexer circuit. A control input for the circuit 278 generally receives the signal COUNT[1:0]. The circuit 278 may present the signals TOTAL_ZEROS0_Q_P1, TOTAL_ZEROS1_Q_P1, TOTAL_ZEROS2_Q_P1, and TOTAL_ZEROS3_Q_P1, one to each instance of the circuit 272. One signals from the circuit 278 may be presented to an input (e.g., INCR) of one of the instances of the circuit 272. The other signals of the circuit 278 may be presented to the inputs INCR of the remaining instances of the circuit 272. One input (e.g., NOP) of the circuit 272 may receive an output (e.g., Q) from the circuit 270. A control input for the circuit 272 generally receives the signal TOTAL_ZEROS_CMD. An output of the circuit 272 may be presented to the D input of the circuit 270.

The circuit 284 may be implemented as a multiplexer. In the example shown, the circuit 284 is implemented as a 3:1 multiplexer. However, the particular number of inputs to the multiplexer 284 may be varied to make the design criteria of a particular implementation. The multiplexer 284 has a control input that may receive the signal TOTAL_ZEROS_OFFSET_CMD. Each instance of the multiplexer 284 receives one input from the circuit 290. An input (e.g., CLEAR) of the circuit 284 generally receives a digital "0". An output of the circuit 284 may be presented to an input (e.g., D) of circuit 282 and an input (e.g., B) of the circuit 280.

The circuit 286 may be implemented as a multiplexer. In one example, the multiplexer 286 may be a 4:1 multiplexer. An output of the multiplexer 286 may be presented to an input (e.g., A) of the circuit 288. The multiplexer 286 receives inputs from each of the instances of the circuit 281. An input (e.g., B) of the circuit 288 may receive a digital "1". The circuit 288 generally presents an output as a sum of the input A and the input B (e.g., A+B). An output of the circuit 288 is normally presented to an input of the circuit 290. The circuit 290 may be implemented as a demultiplexer circuit. A control input for the circuit 290 generally receives the signal COUNT [1:0]. The circuit 290 may present the signals TOTAL_ZEROS_OFFSET0_Q_P1, TOTAL_ZEROS_OFFSET1_Q_P1, TOTAL_ZEROS_OFFSET2_Q_P1, and TOTAL_ZEROS_OFFSET3_Q_P1, one to each instance of the circuit 284. One signal from the circuit 290 may be presented to a control input (e.g., INCR) of one instance of the circuit 284. The other signals from the circuit 290 may be presented to the inputs INCR of the remaining instances of circuit 284. An input (e.g., NOP) of the circuit 284 normally receives an output (e.g., Q) of the circuit 282.

An output of the circuit 272 may be presented to an input (e.g., D) of the circuit 270. The output of the circuit 272 may also be presented to the A input of circuit 280. The circuit 280 generally presents a number of outputs as a difference of the input A and the input B (e.g., A−B) from the signals TOTAL_ZEROS0, TOTAL_ZEROS1, TOTAL_ZEROS2 and TOTAL_ZEROS3.

Figure 8:
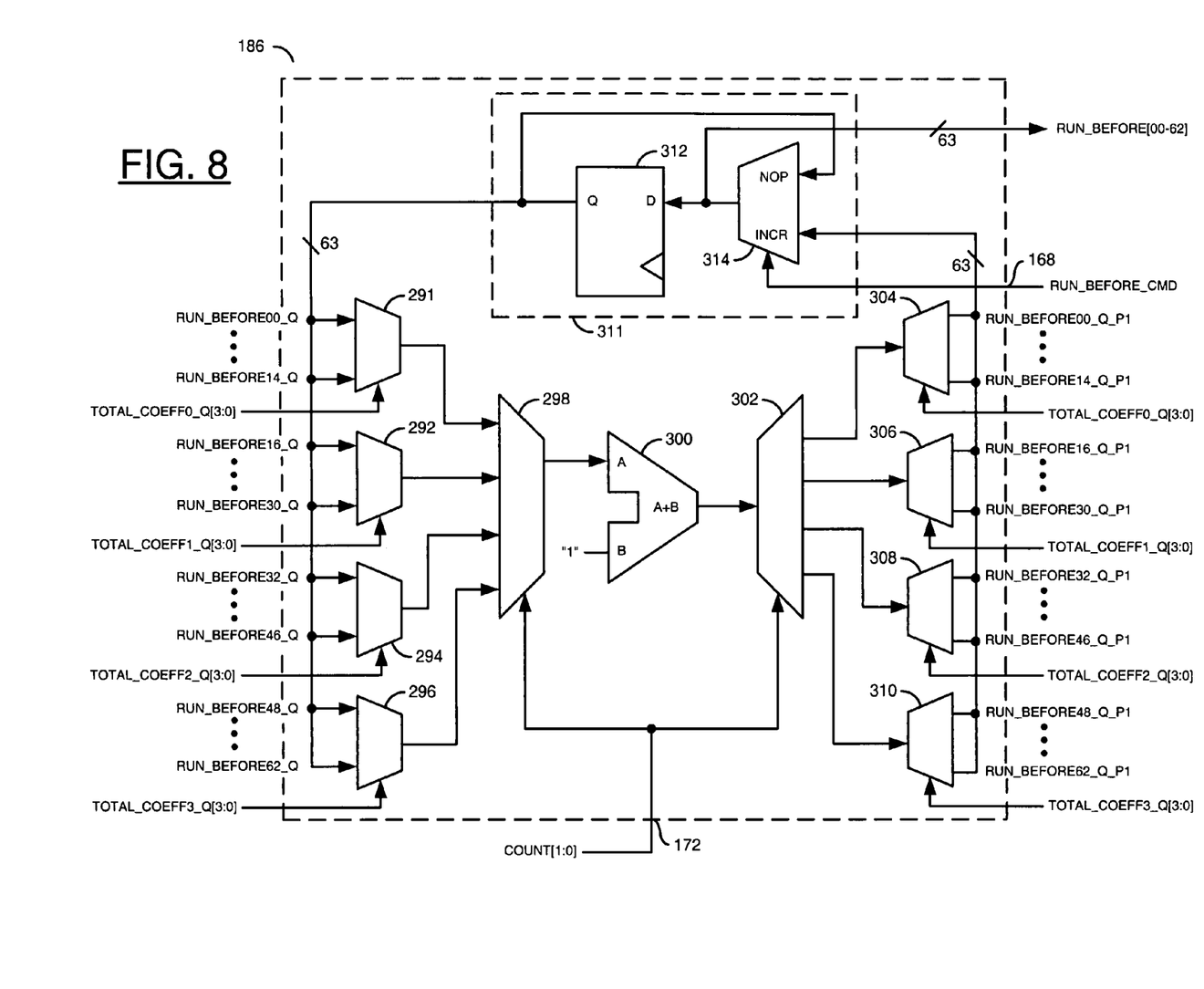
FIG. 8 is a diagram of the reordering the run before semantics.

Referring to FIG. 8, a more detailed diagram of the circuit 186 is shown. The circuit 186 generally comprises a block (or circuit) 291, a block (or circuit) 292, a block (or circuit) 294, a block (or circuit) 296, a block (or circuit) 298, a block (or circuit) 300, a block (or circuit) 302, a block (or circuit) 304, a block (or circuit) 306, a block (or circuit) 308, a block (or circuit) 310, and a block 311 (that generally comprises a number of instances (e.g., 63) of a block (or circuit) 312 and a block (or circuit) 314).

In the example shown, the circuit 291 is implemented as a 15:1 multiplexer. However, the particular number of inputs to the multiplexer 291 may be varied to meet the design criteria of a particular implementation. Each of the inputs to the multiplexer 291 may receive an output from one of the instances of the circuit 312. For example, the multiplexer 291 may also receive the signals RUN_BEFORE00_Q to RUN_BEFORE14_Q. The multiplexer 291 may also have a control input that may receive the signal TOTAL_COEFF0_Q. An output of the multiplexer 291 may be presented to an input of the circuit 298. The circuit 292, the circuit 294 and the circuit 296 have similar inputs and outputs as the circuit 291.

The multiplexer 298 may have a control input that may receive the signal COUNT[1:0]. An output of the multiplexer 298 may be presented to an input (e.g., A) of the circuit 300. An input (e.g., B) of the circuit 300 may receive a digital "1". The circuit 300 generally presents an output as a sum of the input A and the input B (e.g., A+B). The output of the circuit 300 is normally presented to an input of the circuit 302. The circuit 302 may be implemented, in one example, as a 1:4 demultiplexer circuit. A control input for the circuit 302 generally receives the signal COUNT[1:0]. The circuit 302 may present an output to the circuit 304, an output to the circuit 306, an output to the circuit 308, and an output to the circuit 310.

The circuit 304 may be implemented as a 1:15 demultiplexer circuit. A control input for the circuit 304 generally receives the signal TOTAL_COEFF0_Q. The circuit 306, the circuit 308 and the circuit 310 may have similar inputs and/or outputs as the circuit 304.

The circuit 304 may present the signals RUN_BEFORE00_Q_P1 through RUN_BEFORE14_Q_P1, one to each instance of the circuit 314. One signal of the circuit 304 may be presented to a control input (e.g., INCR) of an instance of the circuit 314. The remaining signals may be presented to the INCR inputs of the remaining instances of circuit 314. An input (e.g., NOP) of the circuit 314 normally receives an output (e.g., Q) of the circuit 312. A control input for the circuit 314 generally receives the signal RUN_BEFORE_CMD. An output of the circuit 314 may be presented to an input (e.g., D) of the circuit 312. Each instance of the circuit 314 may present one of the signals RUN_BEFORE00-63.

Figure 9:
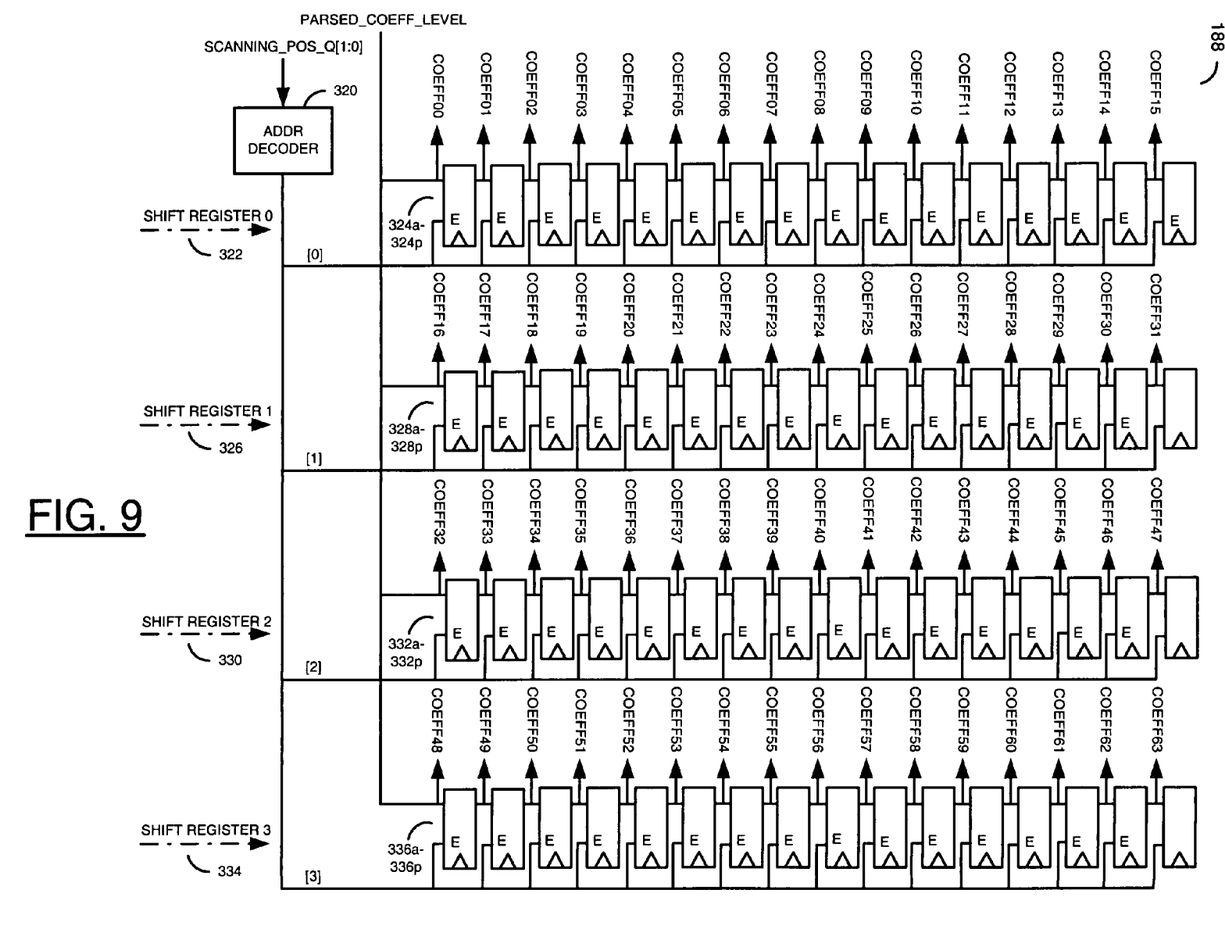
FIG. 9 is a diagram illustrating a coefficient level re-ordering.

Referring to FIG. 9, a more detailed diagram of the circuit 188 is shown. The circuit 188 generally comprises a block (or circuit) 320, a block (or circuit) 322, blocks (or circuits) 324a-324p, a block (or circuit) 326, a number of blocks (or circuits) 328a-328p, a block (or circuit) 330, a number of blocks (or circuits) 332a-332p, a block (or circuit) 334, a number of blocks (or circuits) 336a-336p.

In the example shown, the circuit 320 may be implemented an address decoder. The circuit 320 may receive a signal (e.g., SCANNING_POS_Q[1:0]). The circuit 320 may present an output to the circuit 322, the circuit 326, the circuit 330 and the circuit 334. The circuit 322 may be implemented as a shift register. The circuit 322 may pass a signal to the circuits 324a through 324p. However, the particular number of circuits 324a-324p may be varied to meet the design criteria of a particular implementation.

The circuits 324a through 324p may be implemented as flip-flops within the shift register 322, and may present signals COEFF00 through COEFF15. The circuit 326 may be implemented as a shift register. The circuit 326 may pass a signal to circuits 328a through 328p. However, the particular number of circuits 328a-328p may be varied to make the design criteria of a particular implementation. The circuits 328a through 328p may be implemented as flip-flops within the shift register 326, and may present signals COEFF16 through COEFF31. The circuit 330 and the circuit 334 may have similar implementations. For example, the circuit 330 may pass a signal to circuits 332a through 332p to present signals COEFF32 through COEFF47. The circuit 334 may pass a signal to circuits 336a through 336p and may present signals COEFF48 through COEFF63.

A method by which an 8×8 CABAC residual block of transform coefficient levels is trans-coded into four 4×4 CAVLC residual blocks of transform coefficient levels without loss of performance and increase in area. This is accomplished by performing the re-ordering of total coefficients, run_before and total zeros during (simultaneously with) the parsing stage of the significant_coeff_flag and last_significant_coeff_flag syntax elements. The re-ordering of coefficient levels and trailing ones is performed during parsing of the coeff_abs_level_minus1 and coeff_sign_flag syntax elements. The key to the re-ordering of the coefficient levels and trailing ones lies in the scanning position circuit outlined in the diagrams.

Advantage of Invention

No loss of performance and no (very little) extra hardware are incurred.

Alternate Ways to Make or Use the Invention

General purpose CPU (slower than direct HW implementation).

The present invention may provide a hardware implementation where the four 4×4 CAVLC residual blocks are sub-sampled after the 8×8 CABAC residual block of transform coefficient levels is parsed. This approach incurs latency and thus performance is not maintained.

The present invention may provide a hardware implementation where the four 4×4 CAVLC residual blocks are sub-sampled during parsing of the last transform coefficient level of the 8×8 CABAC residual block of transform coefficient levels. This approach incurs hardware area and hence the cost of the IP is increased.

An H.264 trans-code from CABAC residual block to CAVLC equivalent involves parsing the syntax of the CABAC residual block and converting the transform coefficient levels into CAVLC syntax. For 4×4 trans-code, the CABAC residual block syntax is trans-coded (parsed) into CAVLC syntax without a need for altering the positions of the transform coefficient levels. For 8×8 trans-code, the CABAC transform coefficient levels are re-ordered (parsed and sub-sampled) according to H.264 standard to yield four 4×4 CAVLC residual blocks. The sub-sampling step requires knowledge of the absolute position of the transform coefficient levels within the 8×8 residual block. A straightforward approach to this problem is to break the trans-code operation into two stages: 1) parsing stage and 2) sub-sampling stage when the positions of the transform coefficient levels are known. However, with this approach, latency is incurred by the sub-sampling stage.

The operation of the 8×8 CABAC trans-code is depicted in the figures. In the figures, the signal count[5:0] counts from zero to the last scanning position of the non-zero coefficient in the 8×8 array. The signal NON_ZERO_COEFF_COUNT[6:0] counts the number of non-zero coefficients in the 8×8 array The signal SCANNING_POS_Q[5:0], which is based on the run_before values of the 8×8 CABAC residual block that are created during the significant_coeff_flag syntax parsing, specifies the scanning position of the next coefficient level when it is received. The 2 LSBs of scanning_pos_q indicates the appropriate shift register array to load the coefficient level to (i.e., the appropriate 4×4 CAVLC residual block) and are also used for determining the number of trailing_ones in each 4×4 CAVLC residual block.

The function performed by the diagrams of FIGS. 1-9 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions. As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the scope of the invention.

The invention claimed is:

1. A circuit comprising:
a first module configured to (i) generate a plurality of parsed residual blocks by parsing an 8×8 CABAC (context-based adaptive binary arithmetic coding) residual block received in an input signal and (ii) generate a plurality of metric signals resulting from said parsing of said 8×8 CABAC residual block, wherein said plurality of metric signals comprises (i) a first metric signal indicating a parsed significant coefficient flag, (ii) a second metric signal configured to count from zero to a last scanning position of a non-zero coefficient in said 8×8 CABAC residual block, (iii) a third metric signal configured to count a number of non-zero coefficients in said 8×8 CABAC residual block, and (iv) a fourth metric signal configured to control a next coefficient level scanning position;
a second module configured to generate a scanning position signal based on said first, said second, said third, and said fourth metric signals, wherein said scanning position signal specifies the scanning position of the next coefficient level; and a third module configured to generating a plurality of 4×4 CAVLC (context-based adaptive variable length coding) residual blocks in an output signal by sub-sampling said parsed residual blocks based on said scanning position signal.

2. The circuit according to claim 1, wherein (i) said first module is further configured to generate a run before signal in said parsing of said 8×8 CABAC residual block and (ii) said scanning position signal is generated based on said run before signal.

3. The circuit according to claim 2, wherein said run before signal is generated during said parsing of a significant coefficient flag syntax element of said 8×8 CABAC residual block.

4. The circuit according to claim 2, wherein said second module is further configured to reorder said run before signal.

5. The circuit according to claim 1, wherein said third module is further configured to reorder a plurality of coefficients of said parsed residual blocks during said parsing of both (i) a coefficient absolute level minus one syntax element and (ii) a coefficient signal flag syntax element.

6. The circuit according to claim 1, wherein (i) said first module is further configured to generate a total coefficient signal in said parsing of said 8×8 CABAC residual block and (ii) said third module is further configured to reorder said total coefficient signal during said parsing of both (i) a significant coefficient flag syntax element and (ii) a last significant coefficient flag syntax element.

7. The circuit according to claim 1, wherein (i) said first module is further configured to generate a trailing ones signal in said parsing of said 8×8 CABAC residual block and (ii) said third module is further configured to reorder said trailing ones signal during said parsing of both (i) a coefficient absolute level minus one syntax element and (ii) a coefficient signal flag syntax element.

8. The circuit according to claim 1, wherein (i) said first module is further configured to generate a total zero signal in said parsing of said 8×8 CABAC residual block and (ii) said third module is further configured to reorder said total zero signal during said parsing of both (i) a significant coefficient flag syntax element and (ii) a last significant coefficient flag syntax element.

9. The circuit according to claim 1, wherein (i) said first module is further configured to generate a run before signal in said parsing of said 8×8 CABAC residual block and (ii) said third module is further configured to reorder said run before signal during said parsing of both (i) a significant coefficient flag syntax element and (ii) a last significant coefficient flag syntax element.

10. The circuit according to claim 1, further comprising an arithmetic decoder configured to generate said 8×8 CABAC residual block by decoding a bitstream, wherein said bitstream is compliant with an H.264 recommendation High 10 profile.

11. A method for transcoding an 8×8 CABAC (context-based adaptive binary arithmetic coding) residual block, comprising the steps of:
(A) generating a plurality of parsed residual blocks by parsing said 8×8 CABAC residual block received in an input signal;
(B) generating a plurality of metric signals resulting from said parsing of said 8×8 CABAC residual block, wherein said plurality of metric signals comprises (i) a first metric signal indicating a parsed significant coefficient flag, (ii) a second metric signal configured to count from zero to a last scanning position of a non-zero coefficient in said 8×8 CABAC residual block, (iii) a third metric signal configured to count a number of non-zero coefficients in said 8×8 CABAC residual block, and (iv) a fourth metric signal configured to control a next coefficient level scanning position;
(C) generating a scanning position signal based on said first, said second, said third, and said fourth metric signals, wherein said scanning position signal specifies the scanning position of the next coefficient level; and
(D) generating a plurality of 4×4 CAVLC (context-based adaptive variable length coding) residual blocks in an output signal by sub-sampling said parsed residual blocks based on said scanning position signal.

12. The method according to claim 11, further comprising the step of:
generating a run before signal by parsing said 8×8 CABAC residual block, wherein said scanning position signal is generated based on said run before signal.

13. The method according to claim 12, further wherein said run before signal is generated during said parsing of a significant coefficient flag syntax element of said 8×8 CABAC residual block.

14. The method according to claim 12, further comprising the step of:
reordering said run before signal.

15. The method according to claim 11, further comprising the step of:
reordering a plurality of coefficients of said parsed residual blocks during a parsing of both (i) a coefficient absolute level minus one syntax element and (ii) a coefficient signal flag syntax element.

16. The method according to claim 11, further comprising the steps of:
generating a total coefficient signal by parsing said 8×8 CABAC residual block; and
reordering said total coefficient signal during a parsing of both (i) a significant coefficient flag syntax element and (ii) a last significant coefficient flag syntax element.

17. The method according to claim 11, further comprising the steps of:
generating a trailing ones signal by parsing said 8×8 CABAC residual block; and
reordering said trailing ones signal during a parsing of both (i) a coefficient absolute level minus one syntax element and (ii) a coefficient signal flag syntax element.

18. The method according to claim 11, further comprising the steps of:
generating a total zero signal by parsing said 8×8 CABAC residual block; and
reordering said total zero signal during a parsing of both (i) a significant coefficient flag syntax element and (ii) a last significant coefficient flag syntax element.

19. The method according to claim 11, further comprising the steps of:
generating a run before signal by parsing said 8×8 CABAC residual block; and
reordering said run before signal during a parsing of both (i) a significant coefficient flag syntax element and (ii) a last significant coefficient flag syntax element.

20. A device comprising:
means for generating a plurality of parsed residual blocks by parsing an 8×8 CABAC (context-based adaptive binary arithmetic coding) residual block received in an input signal;
means for generating a plurality of metric signals resulting from said parsing of said 8×8 CABAC residual block, wherein said plurality of metric signals comprises (i) a first metric signal indicating a parsed significant coefficient flag, (ii) a second metric signal configured to count from zero to a last scanning position of a non-zero coefficient in said 8×8 CABAC residual block, (iii) a third metric signal configured to count a number of non-zero coefficients in said 8×8 CABAC residual block, and (iv) a fourth metric signal configured to control a next coefficient level scanning position;

means for generating a scanning position signal based on said first, said second, said third, and said fourth metric signals, wherein said scanning position signal specifies the scanning position of the next coefficient level; and means for generating a plurality of 4×4 CAVLC (context-based adaptive variable length coding) residual blocks in an output signal by sub-sampling said parsed residual blocks based on said scanning position signal.

21. A system comprising:

a first module configured to (i) generate a plurality of first parsed residual blocks by parsing a plurality of 4×4 CAVLC (context-based adaptive variable length coding) residual blocks received in an input signal, (ii) generate a plurality of first metric signals resulting from said parsing of said 4×4 CAVLC residual blocks, (iii) generate a plurality of first scanning position signals based on said first metric signals and (iv) generate an 8×8 CABAC residual block in a bitstream by up-sampling said first parsed residual blocks based on said first scanning position signals; and a second module configured to (i) generate a plurality of second parsed residual blocks by parsing said 8×8 CABAC residual block received in said bitstream, (ii) generate a plurality of second metric signals resulting from said parsing of said 8×8 CABAC residual block, wherein said plurality of metric signals comprises (i) a first metric signal indicating a parsed significant coefficient flag, (ii) a second metric signal configured to count from zero to a last scanning position of a non-zero coefficient in said 8×8 CABAC residual block, (iii) a third metric signal configured to count a number of non-zero coefficients in said 8×8 CABAC residual block, and (iv) a fourth metric signal configured to control a next coefficient level scanning position, (iii) generate a second scanning position signal based on said first, said second, said third, and said fourth metric signals, wherein said scanning position signal specifies the scanning position of the next coefficient level and (iv) recreate said 4×4 CAVLC residual blocks in an output signal by sub-sampling said second parsed residual blocks based on said second scanning position signals.

* * * * *